US008387460B2

(12) United States Patent
Roth et al.

(10) Patent No.: US 8,387,460 B2
(45) Date of Patent: Mar. 5, 2013

(54) VIBRATION DOSIMETER FOR DETERMINING VIBRATIONAL LOADING

(75) Inventors: Markus Roth, Wangen (DE); Andreas Strasser, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 389 days.

(21) Appl. No.: 12/593,052

(22) PCT Filed: Feb. 18, 2008

(86) PCT No.: PCT/EP2008/051943
§ 371 (c)(1),
(2), (4) Date: Sep. 25, 2009

(87) PCT Pub. No.: WO2008/116701
PCT Pub. Date: Oct. 2, 2008

(65) Prior Publication Data
US 2010/0043562 A1    Feb. 25, 2010

(30) Foreign Application Priority Data

Mar. 26, 2007 (DE) .......................... 10 2007 014 893

(51) Int. Cl.
*G01H 11/08* (2006.01)
*G06F 19/00* (2006.01)
*G06F 17/40* (2006.01)

(52) U.S. Cl. .............. 73/579; 73/587; 73/661; 702/176; 702/34; 701/50; 340/683

(58) Field of Classification Search ............ 73/660–661, 73/587, 579; 340/683; 701/50; 702/34, 702/176
See application file for complete search history.

(56) References Cited

U.S. PATENT DOCUMENTS

| | | | | |
|---|---|---|---|---|
| 4,475,401 A | * | 10/1984 | Punia et al. | 73/658 |
| 6,006,164 A | | 12/1999 | McCarty et al. | |
| 6,490,929 B1 | | 12/2002 | Russell et al. | |
| 7,210,356 B2 | * | 5/2007 | Bernhagen | 73/661 |
| 7,818,141 B2 | * | 10/2010 | Roth et al. | 702/176 |
| 2005/0000998 A1 | * | 1/2005 | Grazioli et al. | 227/2 |
| 2008/0134794 A1 | * | 6/2008 | Jonsson | 73/660 |

FOREIGN PATENT DOCUMENTS

| | | | |
|---|---|---|---|
| AU | 717448 B | * | 3/2000 |
| DE | 43 14 464 | | 5/1994 |
| DE | 101 19 252 | | 11/2002 |
| GB | 2 299 169 A | | 9/1996 |
| GB | 2 420 623 A | | 5/2006 |
| SU | 781602 | | 1/1979 |
| SU | 1821650 | | 10/1990 |
| WO | WO 2007/098980 | | 9/2007 |

* cited by examiner

*Primary Examiner* — Peter Macchiarolo
*Assistant Examiner* — Rose M Miller
(74) *Attorney, Agent, or Firm* — Merchant & Gould P.C.

(57) ABSTRACT

A vibration dosimeter (2) for determining the vibrational loading of people includes a determination device (6) for determining the operating period duration, a calculation device (6) for calculating the permitted work time as a function of a tool-specific characteristic vibration value, a comparison device (6) for comparing the effective operating period duration with the permitted work time, and an interface (3) for reading in the characteristic vibration value from the tool (1).

9 Claims, 3 Drawing Sheets

VIBRATION DOSIMETER FOR DETERMINING VIBRATIONAL LOADING

This application is a National Stage Application of PCT/EP2008/051943, filed 18 Feb. 2008, which claims benefit of Serial No. 10 2007 014 893.5, filed 26 Mar. 2007 in Germany and which applications are incorporated herein by reference. To the extent appropriate, a claim of priority is made to each of the above disclosed applications.

TECHNICAL FIELD

The invention relates to a vibration dosimeter for determining the vibrational load of people, who are exposed to mechanical vibrations due to the operation of a tool.

BACKGROUND

DE 101 19 252 A1 describes a device for a personal measurement of vibrational loads, which impact on an operating person, which works at a tool. The device comprises a vibration sensor as well as contact sensors, over which a contact of the operating person with the machine that is creating the vibration has to be determined.

Due to statutory provisions activating and exposure threshold values have to be considered when working with machines that create vibrations, which characterize a maximally permitted daily vibration load and which are not allowed to exceed. These threshold values depend on tool-specific vibration characteristic values, which take a differing strong vibration production at the tool into account. Therefore the consideration of the tool-specific vibration characteristic value is essential for a concrete determination of the vibration load.

SUMMARY

The invention is based on the task to create a vibration dosimeter for determining the vibrational load of people with measures that are simple to implement, who are exposed to mechanical vibrations due to the operation of a tool, whereby the vibration dosimeter shall distinguish itself by a high measuring accuracy and a high operating convenience at the same time.

The vibration dosimeter according to the invention for determining the vibrational load of people, who are exposed to mechanical vibrations due to the operation of a tool, provides an operating duration determination device for determining the effective operating duration of the tool, a calculation unit for calculating the permitted working time at the tool and a comparison device for comparing the effective operating duration with the permitted working time. The permitted working time depends on the tool-specific vibration characteristic value, with which the product-specific vibrations that are created by the tool are characterized. It is ensured by the vibration characteristic value that the maximally permitted working time is set to a lower value at tools with stronger vibrations than at tool with lower vibrations.

In order to enable a flexible application of the vibration dosimeter to different tool types on the one hand and to simplify the handling as much as possible on the other hand it is provided according to the invention that the tool-specific vibration characteristic value is read into the vibration dosimeter over an interface. A manual input of the vibration characteristic value is therefore not required. The reading in of the characteristic value over an interface takes place automatically after activating the vibration dosimeter, whereby erroneous inputs are excluded. The reading of the characteristic value over the interface enables a simple change of the vibration dosimeter between different tools without the need for a manual input of the characteristic value.

The interface can be realized in different ways. A wireless communication interface on the one hand is a possibility as well as a hardware-based interface, whereby for example a Bluetooth-, WLAN-, infrared-, barcode-, UPC- (universal product code), RFID- (radio frequency identification) or a radio-interface come into consideration at wireless interfaces. At hardware-based interfaces the corresponding interface parts at the tool and at the vibration dosimeter are put into communication connection in or at the housing of the tool.

Additional device functions can be transferred over the interface if necessary, as for example different operating statuses of the tool. Thus the drill operation and the chisel operation at drill hammers can be distinguished, which produce different loads onto the operating person.

The transfer over the interface can take place from the vibration dosimeter in the direction of the tool on the one hand but also in the counter direction on the other hand. The vibration characteristic value is transferred from a storage in the tool or the power plug on to the vibration dosimeter and is undergoing there a further processing, in counter direction from the vibration dosimeter deactivation signals can be transferred over the interface for switching of the tool for example when achieving a threshold value.

In order to be able to determine the vibrational load onto an operating person cumulatively, a storage unit is usefully provided in the vibration dosimeter, in which in particular the actual operating duration and/or actual load values can be stored. It is thereby possible to transfer the personal vibration dosimeter to the new tool at a change of the tool, whereby the operating duration or the load duration from the previous working process can be considered over the storage unit in the vibration dosimeter and added to the actual vibrational load. By the consideration of the correspondingly applicable vibration characteristic value a permitted total load can be cumulatively determined, despite a possible change of the tool type. The corresponding tool-specific load value is hereby determined from the effective operating duration and the corresponding vibration characteristic value.

The vibration dosimeter provides furthermore advantageously also a display unit, in order to illustrate the actual status of the vibrational load.

BRIEF DESCRIPTION OF THE DRAWINGS

Further advantages and useful embodiments can be taken from the further claims, the figure description and the drawings. It is shown in:

DETAILED DESCRIPTION

Figure 1:
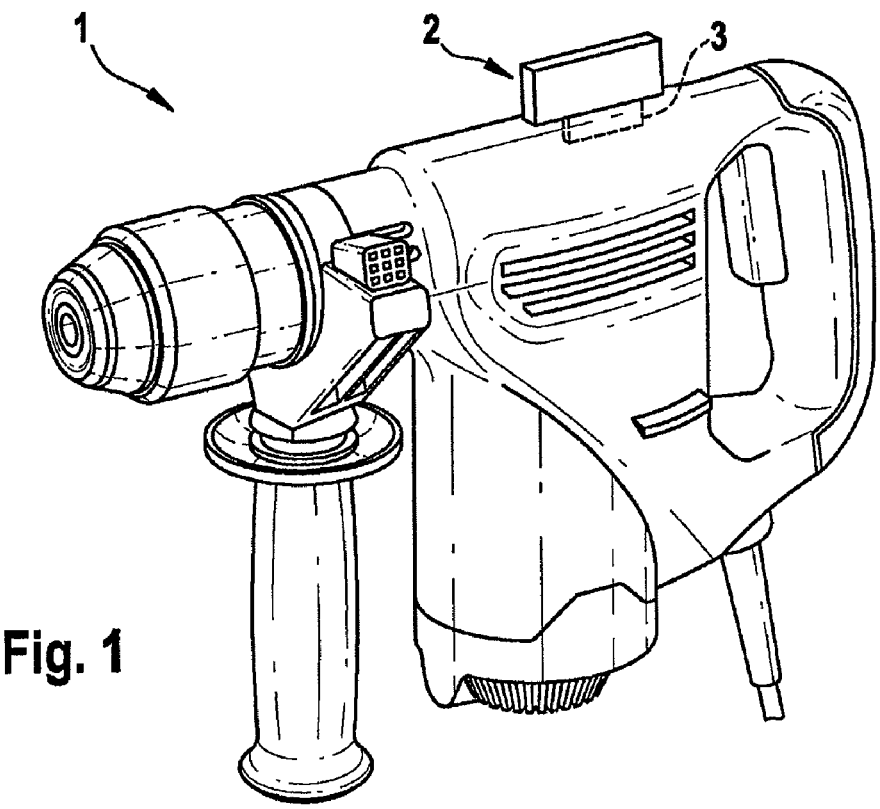
FIG. 1 shows a perspective illustration of a hand tool with an attachable vibration dosimeter, which has to be connected with a control unit of the tool over an interface.

The tool 1 that is shown in FIG. 1 is a hand-operated machine tool, in particular a drill hammer. The vibration dosimeter 2 is attached to the housing of the tool 1 and is provided with an interface 3, which comes into communication connection with a control unit, which is arranged in the tool 1. The interface 3 is preferably implemented as wireless communication interface, for example as Bluetooth- or infrared-interface. But also a hardware-connection of the interface 3 at the vibration dosimeter 2 with an assigned, device-sided interface of the control unit comes into consideration if necessary. The vibration dosimeter 2 is arranged at the housing of the tool 1 in such a way that an accidental detaching of the dosimeter caused by vibrations of the tool is excluded.

Even an arrangement of the vibration dosimeter 2 within the housing of the tool comes into consideration if necessary. But even in that case it is advantageous to connect the vibration dosimeter with the control unit of the tool in a detachable manner.

Figure 2:
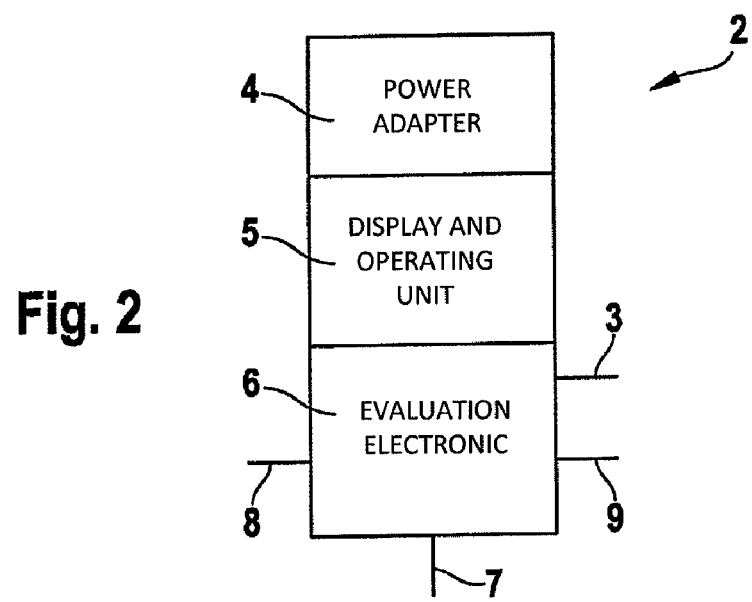
FIG. 2 shows schematically an illustration of the vibration dosimeter including diverse interfaces.

As it can be taken from the illustration according to FIG. 2 the vibration dosimeter 2 provides different component parts, which communicate with each other or with the control unit of the tool. The vibration dosimeter 2 consist of a power adapter 4, a display- and operating unit 5 and an evaluation electronic 6, which carries out or comprises different calculation functions. An operating duration determination unit for determining the effective operating duration of the tool is realized in the evaluation electronic 6, furthermore an arithmetic unit exists in the evaluation electronic for calculating the permitted working time at the tool as a function of a tool-specific vibration characteristic value. This vibration characteristic value is automatically read in by the control unit of the corresponding tool over the interface 3, whereby a manual input of the vibration characteristic value into the vibration dosimeter 2 is unnecessary. Advantageously the evaluation electronic 6 comprises also a storage unit for storing and re-reading the operating duration and/or of load values, which already accrued during the work at the tool and which are considered cumulatively for a resuming of the work at the same tool or another tool. Furthermore a switching-off unit can be integrated into the evaluation electronic for switching off the tool when exceeding a threshold value.

The display- and operating device 5 serves for illustrating the actual status of the vibrational load as well as the manual input or control of the vibration dosimeter.

The interface 3 is implemented as wireless communication interface. Additionally a hardware-interface 8 is provided, with can be connected with an assigned interface on the sides of the control unit in the tool, so that a data exchange can also be implemented over the hardware-interface 8.

Furthermore a PC-interface 7 is provided for a data exchange with a computer.

Over a power plug 9 the vibration dosimeter has to be connected with a power source.

In the evaluation electronic 6 the effective operating duration of the tool is determined, in particular as a function of measuring values, which serve for determining the vibrations of the tool by a measuring unit of the vibration dosimeter. The measuring unit measures for example the occurring accelerations. The permitted maximum working time at the tool is determined in the evaluation electronic as a function of the tool-specific vibration characteristic value, which is read in into the vibration dosimeter over the interface. Subsequently a comparison with the previously determined effective operating duration is carried out in the evaluation electronic, whereby depending on the result of the comparison further measures like the displaying in the display unit or a deactivation of the tool are carried out.

Figure 3:
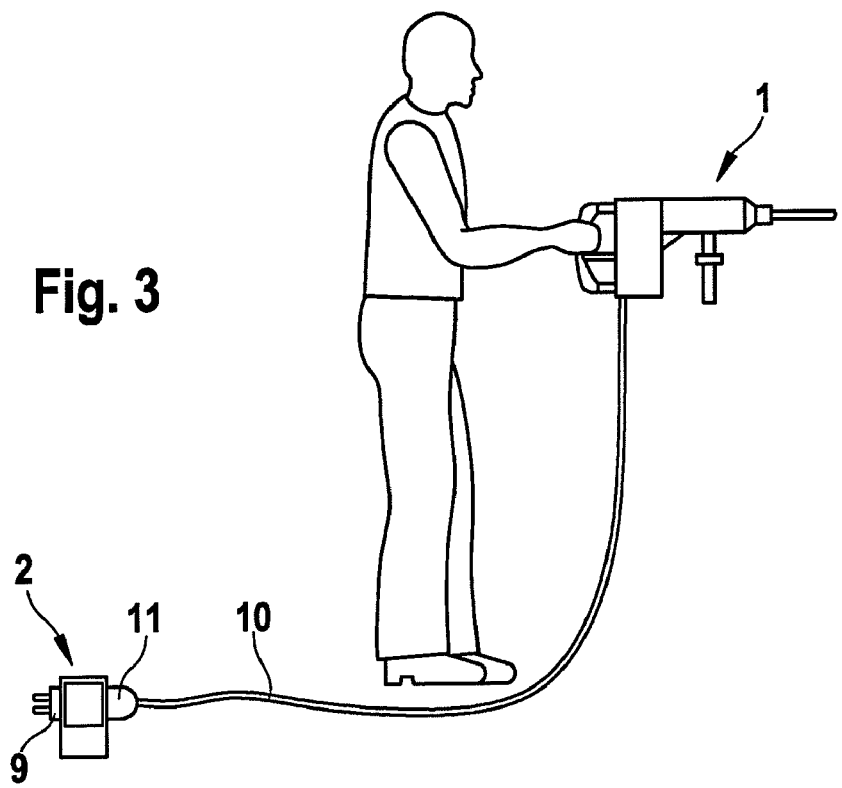
FIG. 3 shows the vibration dosimeter that is interconnected between the power plug of the hand tool and the outlet.
Figure 4:
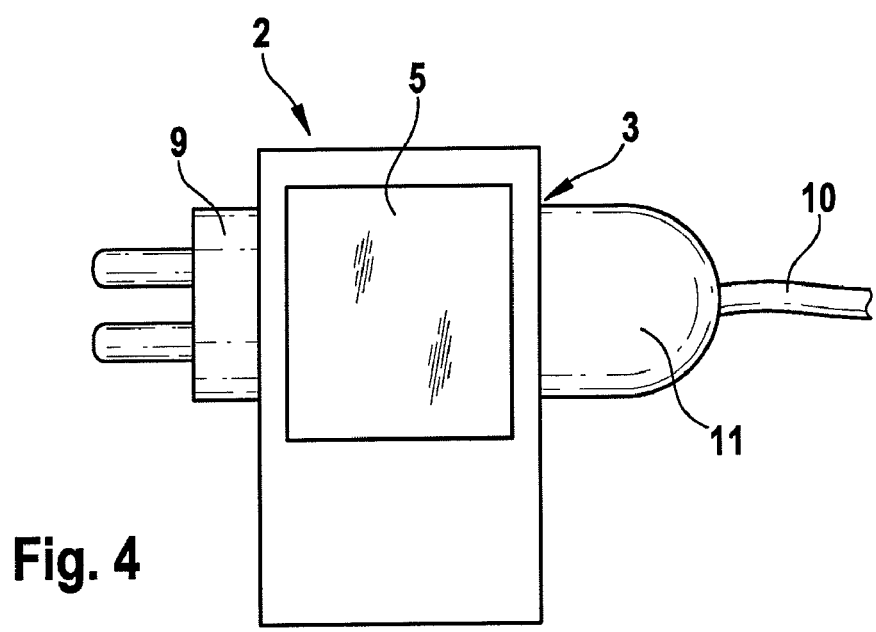
FIG. 4 shows the vibration dosimeter from FIG. 3 including the plugged in power plug in a magnified view.
Figure 5:
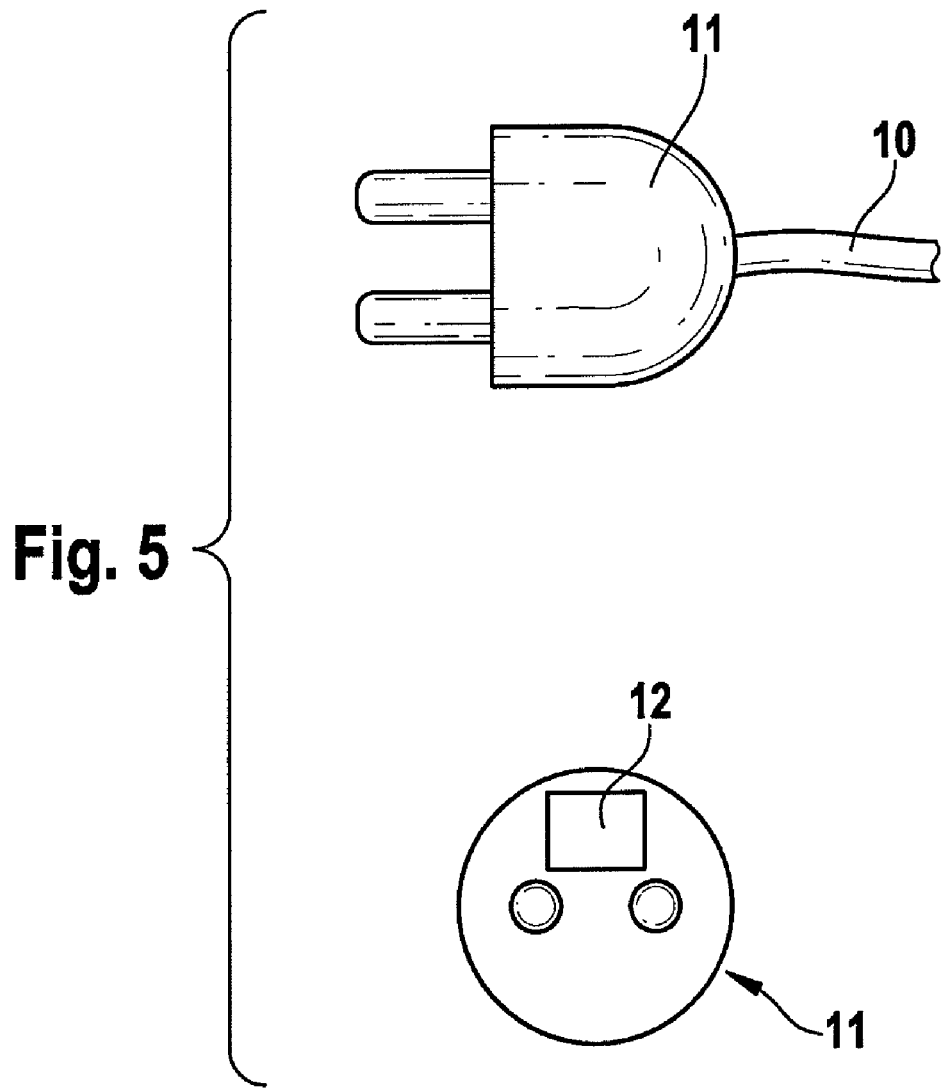
FIG. 5 shows the power plug of the hand tool from two perspectives.

FIGS. 3 to 5 show a further embodiment, at which the vibration dosimeter 2 is located between the power plug 11 of the tool 1 and the outlet. The power plug 11 at the power cable 10 of the tool 1 is plugged into the interface 3 (FIG. 4) of the vibration dosimeter 2, which has the power plug 9, which is plugged into the outlet. In that case the current consumption of the tool 1 is measured by the vibration dosimeter 2.

As it can be seen in FIG. 4 the vibration dosimeter 2 provided a relatively big display as a component of the display- and operating unit 5. The actual load status is shown in the display.

A RFID-chip 12 is located at the power plug 11 of the tool as it can be seen in FIG. 5, over which the tool-specific vibration characteristic value of the tool 1 is transferred to the vibration dosimeter 2 for further processing. The vibration characteristic value is fed into the evaluation electronic of the vibration dosimeter by the RFID-chip 12 over the interface.

The invention claimed is:

1. A vibration dosimeter for determining a vibrational load imparted on an operator from mechanical vibrations that are generated from operation of a tool, comprising:
    an operating duration determination device for determining an effective operating duration of the tool; wherein the operating duration determination device comprises a measuring unit for measuring occurring accelerations; and wherein the effective operating duration is a function of the measured accelerations;
    a calculation device for calculating a permitted working time at the tool as a function of a tool-specific vibration characteristic value;
    a comparison device for comparing an effective operation duration with the permitted working time; and
    an interface for reading in vibration characteristic values of the tool.

2. The vibration dosimeter of claim 1, wherein the interface is implemented as a wireless communication interface comprising one of: a Bluetooth interface; a WLAN interface; an infrared interface; a barcode interface; a universal product code interface; a RFID interface; and a radio interface.

3. The vibration dosimeter of claim 1, wherein additional device functions are transferred over the interface.

4. The vibration dosimeter of claim 3, wherein different operating states of the tool are transferred over the interface including at least one of: a drill hammer operation; and a chisel operation.

5. The vibration dosimeter of claim 4, wherein a deactivation signal is transferred to the tool for deactivating a drive engine when a threshold value is exceeded.

6. The vibration dosimeter of claim 1, further comprising a storage unit for storing and selecting at least one of: the operating duration; and load values that represent an actual vibration load imparted on the operator.

7. The vibration dosimeter of claim 6, wherein an actual load value is determined from the effective operating duration and the tool-specific vibration characteristic value.

8. The vibration dosimeter of claim 1, further comprising, a display device for displaying an actual status, and a switch-off device for switching off the tool when a threshold value is exceeded.

9. The vibration dosimeter of claim 1, further comprising an additional interface for connecting to an external computer.

* * * * *